United States Patent
Morin et al.

(10) Patent No.: US 7,506,373 B2
(45) Date of Patent: Mar. 17, 2009

(54) METHOD OF AUTOMATICALLY CLASSIFYING A SET OF ALARMS EMITTED BY SENSORS FOR DETECTING INTRUSIONS OF AN INFORMATION SECURITY SYSTEM

(75) Inventors: Benjamin Morin, Rennes (FR); Hervé Debar, Louvigny (FR); Elvis Tombini, Caen (FR)

(73) Assignee: France Telecom, Paris (FR)

( * ) Notice: Subject to any disclaimer, the term of this patent is extended or adjusted under 35 U.S.C. 154(b) by 136 days.

(21) Appl. No.: 10/583,588

(22) PCT Filed: Dec. 16, 2004

(86) PCT No.: PCT/FR2004/003251

§ 371 (c)(1),
(2), (4) Date: Jun. 19, 2006

(87) PCT Pub. No.: WO2005/060160

PCT Pub. Date: Jun. 30, 2005

(65) Prior Publication Data

US 2007/0118905 A1    May 24, 2007

(30) Foreign Application Priority Data

Dec. 17, 2003    (FR) .................................. 03 14782

(51) Int. Cl.
*G08B 23/00*    (2006.01)
*H04L 9/00*    (2006.01)
(52) U.S. Cl. .......................... 726/23; 380/37; 340/566; 705/78
(58) Field of Classification Search ........................ None
See application file for complete search history.

(56) References Cited

U.S. PATENT DOCUMENTS 6,393,386 B1 *    5/2002    Zager et al. .................... 703/25

(Continued)

FOREIGN PATENT DOCUMENTS

EP    0 985 995 A    3/2000

(Continued)

OTHER PUBLICATIONS

Julisch, Klaus, "Clustering Intrusion Detection Alarms to Support Root Cause Analysis," Nov. 2003, ACM Transacdtions on Information adn System Security, vol. 6, No. 4, pp. 443-471.*

(Continued)

*Primary Examiner*—Kaveh Abrishamkar
(74) *Attorney, Agent, or Firm*—Cohen Pontani Lieberman & Pavane LLP

(57) ABSTRACT

A method of automatically classifying alerts issued by intrusion detection sensors (11a, 11b, 11c) of an information security system (1) for producing collated alerts, each alert being defined by a plurality of qualitative attributes ($a_1, \ldots, a_n$) belonging to a plurality of attribute domains (A1, ..., An). Attributes belonging to each attribute domain are organized into a hierarchical structure. For each alert issued by the intrusion detection sensors (11a, 11b, 11c), a trellis specific to that alert is constructed by generalizing each alert in accordance with each of its attributes and at all the levels of the hierarchical structure. Each specific trellis is iteratively merged into a general trellis. Collated alerts in the general trellis are identified by selecting the alerts that are simultaneously the most pertinent and the most general. The collated alerts are supplied to an output unit (23) of an alert management system (13).

9 Claims, 5 Drawing Sheets

U.S. PATENT DOCUMENTS 6,446,058 B1    9/2002   Brown
6,690,274 B1 *   2/2004   Bristol .................. 340/506

FOREIGN PATENT DOCUMENTS

WO     WO 01/84285 A    11/2001
WO     WO 03/036914 A    5/2003

OTHER PUBLICATIONS

McHugh, John, "Testing Intrusion Detection Systems: A Critique of the 1998 and 1999 DARPA Intrusion Detection System Evaluations as Performed by Lincoln Laboratory," Nov. 2000, ACM Transactions on Information and System Security, vol. 3, No. 4, pp. 262-294.*

* cited by examiner

METHOD OF AUTOMATICALLY CLASSIFYING A SET OF ALARMS EMITTED BY SENSORS FOR DETECTING INTRUSIONS OF AN INFORMATION SECURITY SYSTEM

RELATED APPLICATIONS

This is a U.S. National Phase Application under 35 USC 371 of International Application PCT/FR2004/003251, filed on 16 Dec. 2004.

BACKGROUND OF THE INVENTION

The invention relates to a method of automatically classifying alerts issued by intrusion detection sensors.

The security of information systems relies on the deployment of intrusion detection systems (IDS) including intrusion detection sensors that send alerts to alert management systems Intrusion detection sensors are active components of the intrusion detector system that analyze one or more sources of data for events characteristic of an intrusive activity, and they send alerts to an alert management system that centralizes the alerts from the various sensors and optionally analyzes all the alerts.

Intrusion detection sensors generate a very large number of alerts, possibly several thousand alerts a day, as a function of the configuration and the environment.

The surplus alerts may result from a combination of several phenomena. First of all, false alerts represent up to 90% of the total number of alerts. Secondly, it is often the case that alerts are too "granular", i.e. that their semantic content is highly impoverished. Finally, alerts are often repetitive and redundant.

To facilitate analysis by a security operator, it is therefore necessary to process alerts upstream of the management system in order to correlate them, i.e. reduce the overall quantity of alerts and simultaneously improve their semantic content. This can be achieved by unsupervised classification of alerts.

The objective of unsupervised classification of alerts is to divide the alert space into a plurality of classes taking account of variables that characterize them.

In the present field of application, the alerts that are classified are described by variables that are essentially qualitative and structured.

The qualitative and structured variables belong to discrete domains, each of which presents partial order.

Classifying qualitative structured variables is known as conceptual classification.

One conceptual classification method is proposed by R. S. Michalsky and R. E. Stepp in their paper "Learning from Observation: Conceptual Clustering" published in "Machine Learning: An Artificial Intelligence Approach" in 1993.

That method takes a data set and constructs a conceptual hierarchy "downwards", dividing a complete data set into separate classes.

Because it divides the data set and is incapable of integrating a new item of data without being reinitialized, the Michalsky method is unsuited to classifying alerts.

Because there can be several new alerts per second, alert databases are highly dynamic.

D. H. Fisher proposes another conceptual classification method in a Ph.D. thesis "Knowledge Acquisition via Incremental Conceptual Clustering", Department of Information and Computer Science, University of California, 1987.

The Fisher method is an incremental conceptual classification method that does not require prior knowledge of the required number of classes. In contrast, this method is applied to nominal variables.

Other methods derived from the Fisher method process structured data. The structure of the hierarchy obtained by those methods depends greatly on the order of insertion of the data. Moreover, the Fisher approach divides up the data set.

Manganaris et al., in a paper entitled "A Data Mining Analysis of RTID Alarms" given at the 2nd International Workshop on Recent Advances in Intrusion Detection 1999, propose modeling a tolerated behavior of an information system using alerts supplied by intrusion detector tools. The use of intrusion detection systems (IDS) in an operational environment shows that the less frequent alerts are generally the more suspect ones.

According to that model, repetitive alerts are considered to be either false alerts caused by normal behavior of information system entities that appears intrusive from the IDS point of view or failures of those entities.

K. Julisch proposes another method of classifying alerts in a paper "Mining Alarm Clusters to Improve Alarm Handling Efficiency", Proceedings of the 17th ACSAC, 2001. That method generalizes alerts to highlight groups of alerts that are more pertinent than each alert considered individually.

The method used by Julisch is a modification of a method proposed by Han et al. in "Exploration of the Power of Attribute-Oriented Induction in Data-Mining, AAAI Press" in "Advances in Knowledge Discovery and Data Mining", MIT Press, 1996.

Briefly, the Han method generalizes structured variables. The domain of each variable has partial order represented by a tree hierarchy, the level of abstraction or generalization whereof increases from the leaves of the hierarchy to its summit.

The Hall method is iterative. Each iteration chooses an attribute and generalizes the attribute of each individual as a function of the associated hierarchy. Variables that are equal after generalization are merged. The overall number of variables therefore decreases on each iteration. The process stops when the number of variables falls below a given threshold.

That criterion for stopping the process is not satisfactory since it is not possible to know a priori how many groups of alerts it is desirable to present to the security operator. Moreover, the generalized alerts obtained may be overgeneralized and of limited interest. The difficulty of that approach therefore consists in finding a good compromise between greatly reducing the number of alerts and maintaining their pertinence.

The modification introduced by Julisch consists in removing from the set of alerts subjected to the generalization process any generalized alerts for which the number of underlying alert instances exceeds a given threshold.

To avoid overgeneralization, generalization of the remaining generalized alerts is cancelled and the process iterated using another attribute.

The drawback of that method is that it is unable to identify pertinent generalizations that might have arisen if the alerts supplied to the security operator had been retained for subsequent generalizations. Moreover, the nature of the generalized alerts obtained depends on the order of the attributes, which is based on heuristics.

Finally, the Julisch method is not incremental and the generalization process must be reinitialized on each request from the security operator.

OBJECTS AND SUMMARY OF THE INVENTION

Objects of the invention are to remedy the above drawbacks, to provide a simple method of unsupervised classification of alerts issued by intrusion detection sensors to generate the most general and the most pertinent collated alerts providing an overview of all the alerts, and to do this entirely automatically.

The above objects are achieved by a method of automatically classifying alerts issued by intrusion detection sensors of an information security system for producing collated alerts, each alert being defined by a plurality of qualitative attributes belonging to a plurality of attribute domains each of which has a partial order relationship, which method is characterized in that it comprises the following steps:

- organizing the attributes belonging to each attribute domain into a hierarchical structure including levels defined in accordance with the partial order relationship of the attribute domain, the attribute domains thus forming hierarchical structures;
- constructing for each alert issued by the intrusion detection sensors a trellis specific to that alert by generalizing each alert in accordance with each of its attributes and at all the levels of the hierarchical structure, the specific trellis including nodes, corresponding to alerts, linked to each other by arcs so that each node is linked to one or more parent nodes and/or to one or more child or descendant nodes;
- iteratively merging each specific trellis into a general trellis;
- identifying collated alerts in the general trellis by selecting the alerts that are simultaneously the most pertinent and the most general in accordance with statistical criteria and according to their attributes belonging to lower levels of the hierarchical structures; and
- supplying the collated alerts to an output unit of an alert management system in order to provide an overview of all the alerts issued by the intrusion detection sensors.

Thus the method of the invention is an incremental method and supplies classes of alerts that are potentially separate.

According to a first aspect of the invention, the construction of a specific trellis includes the following steps:

- for any generalizable attribute of a given alert, recovering the generalized value of that attribute from its hierarchical structure to form a new alert more general than said given alert;
- adding a new node to the specific trellis corresponding to the new alert and adding an arc going from the new node of the new alert to the node of the given alert; and
- adding missing arcs going from the parent nodes of the given alert resulting from the generalization of the given alert in accordance with its other attributes to the node of the new alert.

According to a second aspect of the invention, merging a given specific trellis into the general trellis includes the following steps:

- selecting a first node corresponding to a first alert belonging to the given specific trellis and a second node corresponding to a second alert belonging to the general trellis;
- eliminating all the arcs coming from the parent nodes of an offspring node of the first node if said offspring node belongs to said general trellis; and
- adding said offspring node and all its descendants to the general trellis is said offspring node does not belong to the general trellis.

According to a third aspect of the invention, a pertinent alert is identified when each of the sets of offspring nodes of the pertinent alert resulting from specialization of that alert in accordance with each of its attribute domains is homogeneous and when the number of elements constituting each of said sets of offspring nodes of the pertinent alert is greater than a threshold value.

The collated alerts are advantageously associated with different groups of alerts issued by the sensors so that the groups are not mutually exclusive.

The attribute domains may include domains from the following sets: alert identifiers, attack sources, attack targets, and attack dates.

The invention is also directed to a computer program designed to execute the above method when it is executed by the alert management system.

BRIEF DESCRIPTION OF THE DRAWINGS

Other features and advantages of the invention emerge on reading the description given below by way of illustrative and non-limiting example and with reference to the appended drawings, in which.

DETAILED DESCRIPTION OF EMBODIMENTS OF THE INVENTION

Figure 1:
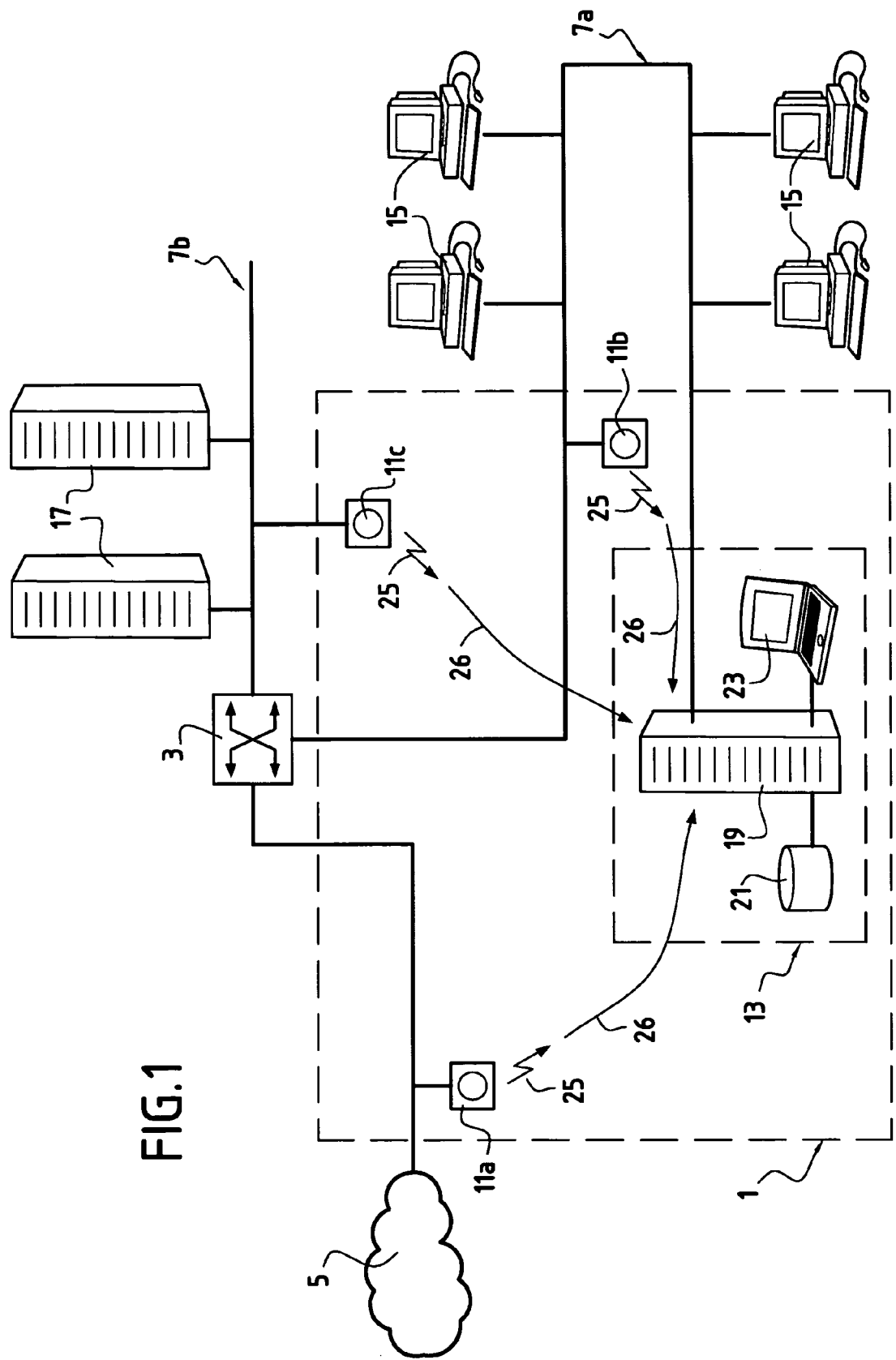
FIG. 1 is a diagram of an information security system including an alert management system according to the invention.

FIG. 1 shows one example of an intrusion detection system 1 connected via a router 3 to an external network 5 and to a distributed architecture internal network 7a, 7b.

The intrusion detection system 1 includes intrusion detection sensors 11a, 11b, 11c and an alert management system 13. A first intrusion detection sensor 11a monitors alerts coming from outside, a second intrusion detection sensor 11b monitors a portion 7a of the internal network comprising workstations 15, and the third intrusion detection sensor 11c monitors another portion 7b of the internal network comprising servers 17 supplying information to the external network 5.

The alert management system 13 includes a host 19 dedicated to processing alerts, a database 21, and an output unit 23.

As indicated by the arrows 26, the sensors 11a, 11b, 11c of the intrusion detection system 1 send alerts 25 to the alert management system 13 which, in accordance with the invention, automatically classifies these alerts and sends collated alerts to the output unit 23 in order to provide an overview of all the alerts issued by the intrusion detection sensors 11a, 11b, 11c.

The host 19 of the alert management system 13 comprises processor means for automatically classifying alerts and storing the resulting classification in the form of a trellis in the database 21.

The alert management system executes a computer program designed to execute the present invention.

Alerts and data in general that may be subjected to conceptual classification, constitute sets of n attributes $(a_1, \ldots a_i, \ldots, a_n) \in A1 \times \ldots \times Ai \times \ldots \times An$, where Ai is a discrete set having a partial order relationship $\prec_{Ai}$ defining the domain of the attribute $a_i$.

Partially ordered sets may be represented by a Hasse diagram, i.e. by an acyclic directed graph or a hierarchical structure $G=(A_i, \text{cov er}(\prec_{Ai}))$ whose set of nodes consists of the elements of Ai and whose set of arcs consists of the coverage of the partial order relationship.

In this embodiment, the attribute hierarchies are restricted to balanced trees: each attribute value has at most a single parent and the distance from the leaves of the tree to its summit is a constant. However, the present invention may easily be adapted to more elaborate hierarchies.

A hierarchical structure may be considered as a tree structure in which the ancestor of an element b is an element a such that $b \prec_{Ai} a$. In this case the element a is more abstract or more general than the element b and conversely the element b is more specific than the element a.

In particular, the element a is a direct ancestor of the element b if $(a,b) \in \text{cov er}(\prec_{Ai})$, i.e. if there is no intermediate element g between the elements a and b or, formally, if $b \prec_{Ai} a$ and $(\exists g/(g \prec_{Ai} a \text{ and } b \prec_{Ai} g))$.

The most specific elements of an attribute domain Ai, forming a hierarchical structure, define the leaves of the hierarchical structure. Thus a leaf f is an element $f \in Ai$ such that $\exists g \in A_i$ such that $g \prec_{Ai} f$.

Each attribute has a level of abstraction or generalization defined by an integer that corresponds to the height of the attribute in the hierarchical structure. The level 0 is assigned to the root of the hierarchy, i.e. to the most general set of elements. The level of abstraction or generalization of any element is the value of the level of abstraction of its direct ancestor plus 1.

Thus each alert may be defined by qualitative attributes $(a_1, \ldots, a_i, \ldots, a_n)$ belonging to attribute domains $(A1, \ldots, Ai, \ldots, An)$ each of which has a partial order relationship.

The attributes belonging to each attribute domain Ai may therefore be organized into a hierarchical structure including levels defined according to the partial order relationship of the attribute domain. The attribute domains $(A1, \ldots, Ai, \ldots, An)$ then form hierarchical structures.

Generally speaking, the term "concept" is used to designate any element of $A1 \times \ldots \times An$. Also, undergeneralized concepts, i.e. concepts whose attributes belong only to the leaves of the hierarchies, are referred to as "individuals". Accordingly, alerts issued by the intrusion detection sensor 11a, 11b, 11c may be considered as individuals constituting the subject matter of the classification.

The object of classification in accordance with the invention is to identify pertinent concepts by successively generalizing the attributes of the individuals as a function of their partial order relationship.

The concepts to be classified are structured in a trellis $T=(C,R)$ where $R \subseteq C \times C$ and C is the set of nodes of the trellis corresponding to the concepts. Thus in a trellis the idea of a concept and the idea of a node may be regarded as equivalent.

If the node $c_1$ results from the abstraction or generalization of the node $c_2$ according to any attribute, there is a link $(c_1,c_2) \in R$ from the node $c_1$ to the node $c_2$. The notation $\uparrow(c_1)=\{c_2 \in C/(c_2,c_1) \in R\}$ denotes the set of parent nodes of the node $c_1$. Similarly, the notation $\downarrow(c_1)=\{c_2 \in C/(c_1,c_2) \in R\}$ denotes the set of offspring nodes of the node $c_1$.

The subset $\downarrow^{Ai}(c)$ of the set $\downarrow(c)$ is the set of offspring nodes of the node c resulting from specialization of the node c in accordance with the attribute domain Ai.

Similarly, the subset $\downarrow^{Ai}(c)$ of the set $\uparrow(c)$ is the set of parent nodes of the node c resulting from generalization of the node c in accordance with the attribute domain Ai.

Note that the relationship $\downarrow^{Ai}$ may be considered a function if the hierarchical structure is a tree structure.

Thus a partial order relationship $\triangleleft$ may be defined for the set of concepts as follows:

$$\triangleleft \in C \leftrightarrow C: c_1 \triangleleft c_2 \Leftrightarrow \begin{cases} \exists Ai, c_1[Ai] \prec_{Ai} c_2[Ai] \\ \forall Aj, c_1[Aj] \preceq_{Ai} c_2[Aj] \end{cases},$$

where c[Ai] denotes the attribute belonging to the attribute domain Ai of the concept c.

This partial order relationship $\triangleleft$ is used, for each individual i, in particular for each alert issued by the intrusion detection sensors, to construct a trellis specific to that alert by generalizing each alert according to each of its attributes and to all the levels of the hierarchical structure.

Formally, if $i=(a_1, \ldots, a_n)$ is an individual, the specific trellis $Ti=(Ci,Ri)$ associated with the individual i is defined as follows:

$$Ci = \{(c_1, \ldots c_n) \in A1 \times \ldots An / a_j \preceq_{Aj} c_j\}$$

$$Ri = \left\{(c_j, c_k) \in Ci \times Ci \Big/ \begin{cases} \exists ! Al/(c_j[Al], c_k[Al]) \in \text{ cover}(\prec_{Al}) \\ \forall Am \neq Al, c_j[Am] = c_k[Am] \end{cases}\right\}$$

Thus a general trellis containing all the concepts may be constructed by successively adding specific trellises.

An individual is inserted into the general trellis by merging the trellis specific to the individual with the general trellis.

Formally, given the set I of individuals, the general trellis $T=(C,R)$ is defined as follows:

$$C = \bigcup_{i \in I} Ci \text{ and}$$

$$R = \bigcup_{i \in I} Ri$$

Thus a specific trellis can be constructed for each alert issued by the intrusion detection sensors 11a, 11b, 11c. This specific trellis therefore includes nodes corresponding to alerts linked by arcs so that each node is linked to one or more parent nodes and/or to one or more offspring or descendant nodes.

Each specific trellis associated with alerts issued by the intrusion detection sensors can then be merged iteratively into the general trellis.

Finally, collated alerts can be identified in the general trellis by selecting the alerts that are both the most pertinent and the most general in accordance with statistical criteria and according to their attributes belonging to lower levels of the hierarchical structures.

Figure 2:
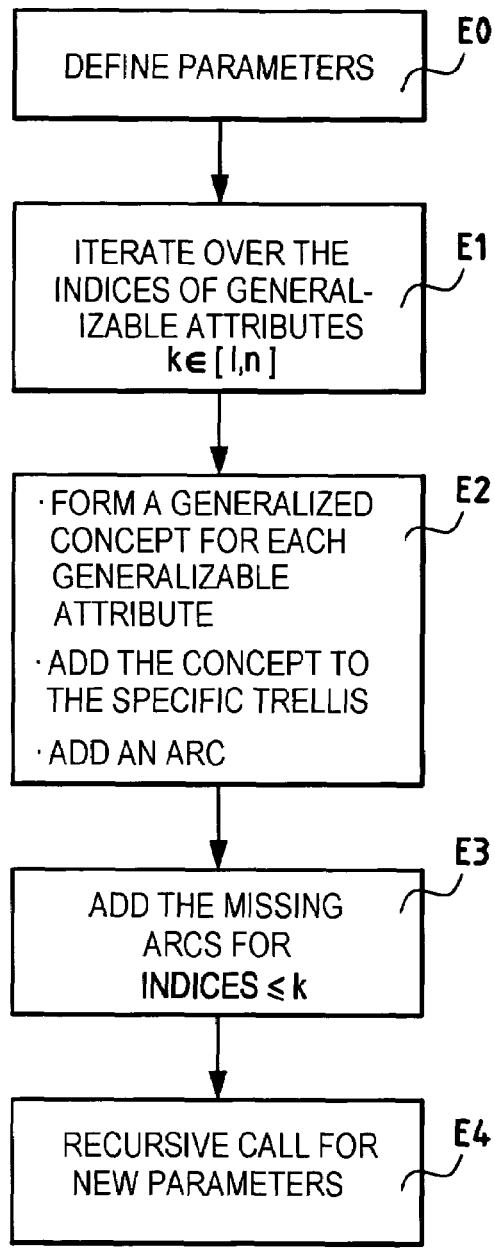
FIG. 2 is a flowchart of the formation of a specific trellis in accordance with the invention.
Figure 3:
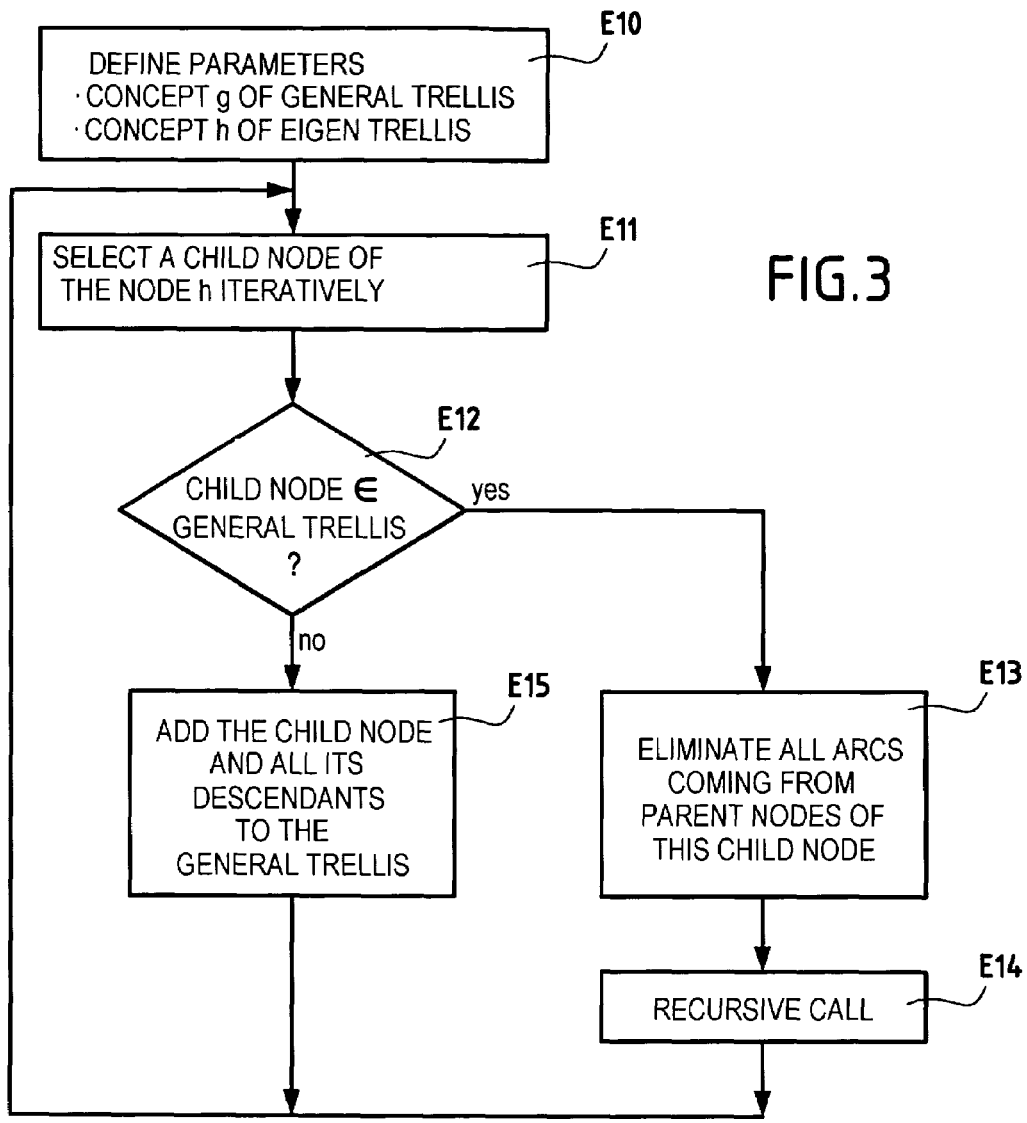
FIG. 3 is a flowchart of merging a specific trellis into a general trellis in accordance with the invention.
Figure 4:
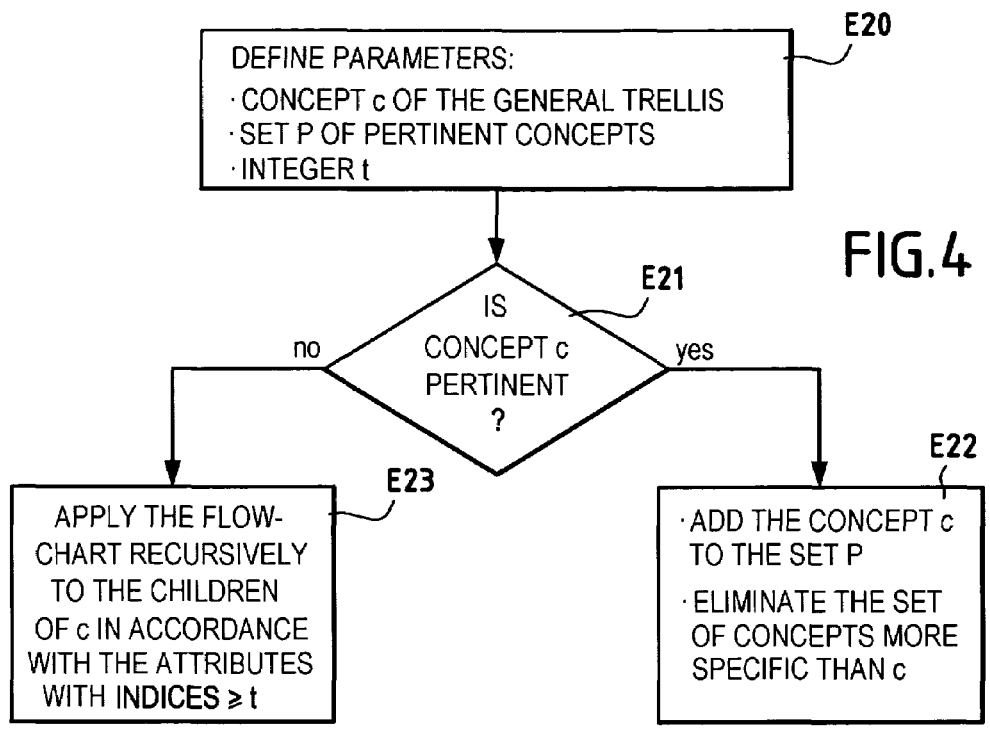
FIG. 4 is a flowchart of the selection of collated alerts in accordance with the invention.

FIGS. 2 to 4 are flowcharts illustrating the formation of the trellis specific to a given individual, the merging of a given specific trellis into the general trellis, and the selection of pertinent and general concepts.

The FIG. 2 flowchart shows the formation of a trellis specific to a given individual. It shows more particularly the construction of a specific trellis Ti=(Ci,Ri) that is being produced in the vicinity of a given concept or a given alert.

In the step E0, the given concept $c=(a_1, \ldots, a_n)$ and the index l corresponding to the index of the attribute from which the generalization is effected are defined, knowing that generalizations according to attributes with lower indices are considered to correspond to concepts that have already been added to the specific trellis Ti during previous recursive calls.

The steps E1 to E3 constitute a main loop that iterates over the indices of attributes in accordance with which the node specified in a parameter is to be generalized in the step E0. The iteration is effected for all the indices k between l and n and for all the generalizable attributes $a_k$.

Accordingly, for any attribute $a_k$ that can be generalized from its hierarchical structure, the step E2 computes the function genAtt(c,k) that recovers the value of the attribute that generalizes that of $a_k$ to form a concept p corresponding to the generalization of the concept c in accordance with the index k.

The generalized concept p is added to the trellis Ci=Ci∪p and an arc is added from the concept c to the concept p, i.e. Ri=Ri∪{(p,c)}.

The step E3 is an internal loop which adds the missing arcs going from the parent nodes of the concept c resulting from the generalization of the concept c in accordance with all the attributes having an index less than or equal to k, i.e. Ri=Ri∪ $\{(\uparrow^{Ak}\uparrow^{Ah}(c),p)\}$.

The step E4 is a recursive call in which the algorithm is executed with new parameters.

Thus the algorithm for the formation of a specific trellis for a given concept c may be defined as follows:

Algorithm: Specific trellis
  Given: The concept $c=(a_1, \ldots, a_n)$,
    the index l of the attribute from which to generalize,
    the trellis Ti=(Ci,Ri) being produced.

```
for k∈[l;n] do
    if a_k is generalizable, then
        p = genAtt(c,k)
        Ci = Ci∪p
        Ri = Ri∪{(p,c)}
        for h∈[o,k] do
            Ri = Ri∪{(↑^Ak ↑^Ah (c),p)}
        end
    end
        specific trellis(p,k,Ti)
end.
```

Figure 2A:
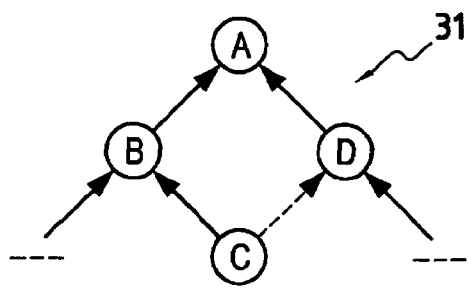
FIG. 2A is a diagram of the FIG. 2 mechanism.

FIG. 2A shows more particularly one example of the construction of the specific trellis 31 from a given alert corresponding to a given node A according to the second attribute of the node A, in other words from the call parameters (c=A, k=1,Ti=Tc).

Generally speaking, for any generalizable attribute of the given alert, the generalized value of that attribute is recovered from its hierarchical structure to form a new alert more general than the given alert.

In this example, in the step k=2 of the algorithm, a new node D corresponding to the new alert formed in accordance with the generalization of the second attribute of the node A is added to the specific trellis together with an arc (D, A) going from the new node D of the new alert to the node A of the given alert.

Missing arcs going from the parent nodes of the given alert A to the node D of the new alert are then added. The parent nodes of the given alert are obtained from the generalization of the given alert in accordance with its other attributes.

In this example, the trellis with summit B was constructed in the preceding iteration (k=1). The generalizations of D in accordance with attributes whose index is less than k have already been added, in this instance C, for k=1. Accordingly, only the missing arc (C, D) is added.

The algorithm is executed recursively with the parameters (D, 2, T).

Generally speaking, the trellis specific to an stop individual $i=(a_1, \ldots, a_n)$ is obtained by calling the Specific trellis algorithm (c=i,k=1,Ti=({i},{ })), knowing at the outset that the specific trellis associated with the node i is formed of a single node and that the set of arcs is still empty.

The FIG. 3 flowchart shows the merging of a given specific trellis into the general trellis.

In a step E10, initialization parameters are defined. In particular, a first node is selected corresponding to a first alert or concept h belonging to the specific trellis Ti=(Ci,Ri) and a second node is selected corresponding to a second alert or concept g belonging to the general trellis T=(C,R).

The main loop between the steps E11 and E14 or E15 iterates over the set of offspring nodes of the node h of the specific trellis entered as parameters, i.e. for $h_j \in \downarrow(h)$.

Thus in the step E11 an offspring node $h_j$ of the first node h is selected.

The step E12 verifies if that offspring node $h_j$ of the first node h also belongs to the general trellis. In other words, it verifies if $\exists g_j \in \downarrow(g)$ such that $g_j = h_j$.

If so, all the arcs coming from parent nodes of this offspring node are eliminated Ri=Ri-↑($h_j$) in the step E13 before proceeding to the step E14.

The following proposition states that if a node $h_j$ of a specific trellis already exists in the general trellis, then all its parents are also there, in other words:

$$(h_j \in Ci\ \exists g_k \in C, h_j = g_k) \Rightarrow \uparrow(h) \subseteq C$$

The step E15 is a recursive call in which the algorithm is executed again from the step E11 with new parameters.

The offspring of the node $h_j$ are not necessarily in the general trellis and the algorithm must therefore be executed recursively for the node $h_j$.

On the other hand, if the offspring node is not in the general trellis, then it suffices to add it and all its descendants thereto T=T∪T$h_j$ in the step E15 before returning to the step E11.

The counterproposition of the above proposition ensures that there is no duplication of nodes.

Thus the algorithm for merging a specific trellis with the general trellis may be defined as follows:

Algorithm: Trellis merging
  Given: A concept g of the general trellis T=(C,R),
    a concept h of the specific trellis Ti=(Ci,Ri) of the individual i

```
for each concept h_j∈↓(h) do
    if ∃g_j∈↓(g) such that g_j = h_j then
        Ri = Ri-↑(h_j)
        Trellis merging (g_j,h_j)
    end
    else
```

-continued

```
        Ri = Ri-{(h,h_j)}
        T = T∪Th_j
    end
end.
```

Figure 3A:
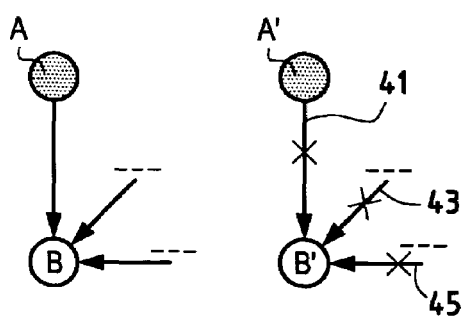
FIGS. 3A and 3B are diagrams of the FIG. 3 mechanism.
Figure 3B:
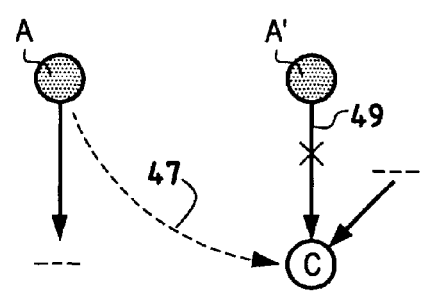

FIGS. 3A to 3B are diagrams of the mechanism for merging a specific trellis with the general trellis in accordance with the FIG. 3 flowchart.

In FIGS. 3A and 3B, the left-hand trellis portion belongs to the general trellis and the right-hand trellis portion belongs to the specific trellis that is to be merged. The shaded nodes are the algorithm calling parameters. They are assumed to be equal (A=A').

In FIG. 3A, one of the offspring B' of A' is already present in A (B'=B). The links 41, 43 and 45 to the immediate ancestors of B' are eliminated because it is known that they are already in the general trellis. The algorithm is then called recursively on B and B'.

In FIG. 3B, the node C does not exist as an offspring of A, a link 47 (dashed line) is created between A and C, and the link 49 that linked C to A' is eliminated. The sub-trellis having the summit C is therefore integrated into the general trellis.

The algorithm is called with the summits of the trellis specific to the individual to be inserted and the summit of the general trellis as arguments. This confirms the hypothesis that the concepts used as arguments for the algorithm are equal as all the trellises have a common summit corresponding to the most general node.

The FIG. 4 flowchart shows how concepts or alerts are collated by supplying a set P of concepts or alerts that are simultaneously the most pertinent and the most general of an alert or concept c.

An alert or concept c is pertinent if each of the sets $\downarrow^{Ai}(c)$ is homogeneous and sufficiently large.

A set of alerts and concepts is homogeneous if the spread of the number of individuals covered by each concept is not too broad. To this end a variation coefficient is used in a manner that is known in the art.

A set $\downarrow^{Ai}(c)$ is sufficiently large if the number of elements that constitute it is greater than a threshold value linked to the level of abstraction or generalization of the attribute Ai of c.

Formally:

$$p(c) \Leftrightarrow \forall\, Ai, \left(|Ai| > \tau_{c_{Ai}} \text{ and } \frac{\sigma_{F_{Ai}}}{m_{F_{Ai}}} < 1\right),$$

where the function p(c) designates a Boolean function indicating if a node is pertinent, $F_{Ai}$ is the set formed of the individuals covered by each concept of the set $\downarrow^{Ai}(c)$, $m_{F_{Ai}}$ is the mean of $F_{Ai}$, $\sigma_{F_{Ai}}$ is its variance, and $\tau_{c_{Ai}}$ represents the threshold value linked to the level of abstraction of the attribute domain Ai of c.

The number of individuals covered by a concept is a value linked to each node of the trellis and updated at the time of merging a specific trellis associated with an individual with the general trellis.

Thus an alert is pertinent if each of the sets of offspring nodes of the pertinent alert c resulting from the specialization of that alert c in accordance with each of its attribute domains is homogeneous and if the elements constituting each of the sets of offspring nodes of the pertinent alert c is greater than a threshold value.

The step E20 of the FIG. 4 flowchart corresponds to the definition of the call parameters, which include a concept c of the general trellis T=(C,R), a set P of pertinent concepts found previously, and an integer t used to work through the trellis.

The step E21 is a test for verifying the pertinence of the concept c. Thus if the concept c is pertinent, the next step is the step E22 in which the concept c is added to the set P of pertinent concepts P=P∪{c} and any set of concepts more specific than the concept c that may have been added previously is eliminated from the set P, that is to say P=P−{$c_i \in P/c_i \triangleleft c$}. The concepts that are the most abstract but nevertheless pertinent are what is being looked for.

On the other hand, if the concept c is not pertinent, then the algorithm is applied recursively in the step E23 to all of the offspring of the concept c resulting from the specialization of the concept c in accordance with the attributes with indices i greater than or equal to t, i.e. $c_i \in \downarrow^{Ai}(c)$, knowing that the other attributes have already been analyzed.

When the algorithm finishes, a list of the concepts deemed pertinent and general is supplied to the output unit 23 of the alert management system 13 so that a security operator can obtain an overview of all the alerts. If the operator requires details of any concept c he deems too abstract, then the algorithm is executed again over the offspring of the concept c.

Thus the algorithm for collating concepts may be defined as follows:

Algorithm: Collate
    Given: A concept c of the general trellis T=(C,R),
    a set P of the pertinent concepts found previously
    an integer t used to work through the trellis

```
if p(c) then
    P = P-{c_i∈P|c_i ◁c}
    P = P∪{c}
end
else
    for l∈[t,n] do
        for each element c_i∈↓^{Ai}(c) do
            Collate(c_i,P,l)
        end
    end
end
```

Note that the collated alerts are associated with different groups of alerts issued by the sensors, with the result that these groups are not necessarily mutually exclusive.

Figure 5:
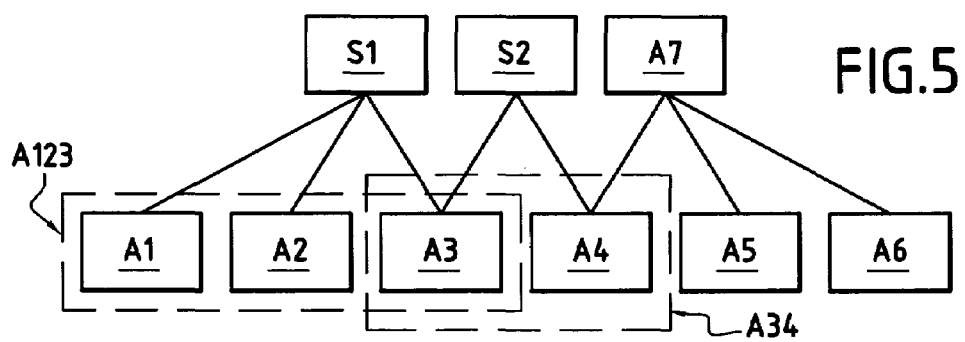
FIG. 5 is a diagram of an alert associated with various collated alerts according to the invention.

FIG. 5 is a diagram of an alert associated with different collated alerts.

The alerts A1 to A6 issued by the intrusion detection sensors are the leaves of the general trellis. The group of alerts associated with a general alert comprises all the leaves accessible from that general alert.

Accordingly, the alert group A123 is associated with the collated alert S1 and the alert group A34 is associated with the collated alert S2. On the other hand, the alerts A4 to A6 are associated with a general alert A7 that is not a collated alert.

Given the structure of the trellis, the alert groups are not mutually exclusive. Accordingly, the alert A3 participates in two phenomena, i.e. in two different alert groups A123 and A34.

The alerts issued by the intrusion detection sensors are individuals defined by a plurality of attributes belonging to a plurality of attribute domains. The attribute domains may include a set of alert identifiers, a set of attack sources, a set of attack targets, and a set of attack dates.

Figures 6A, 6B, 6C:
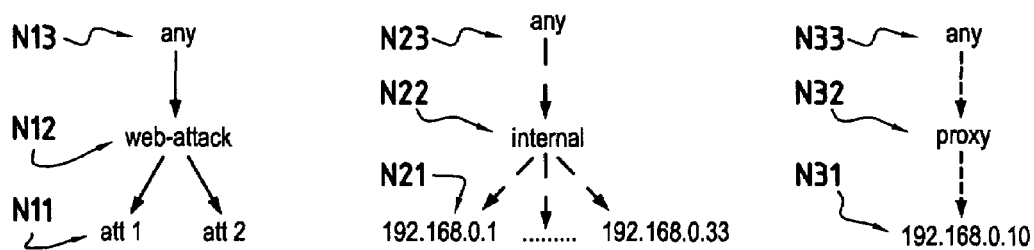
FIG. 6A to 6C are diagrams of simplified hierarchies associated with attribute domains of alerts according to the invention.
Figure 7:
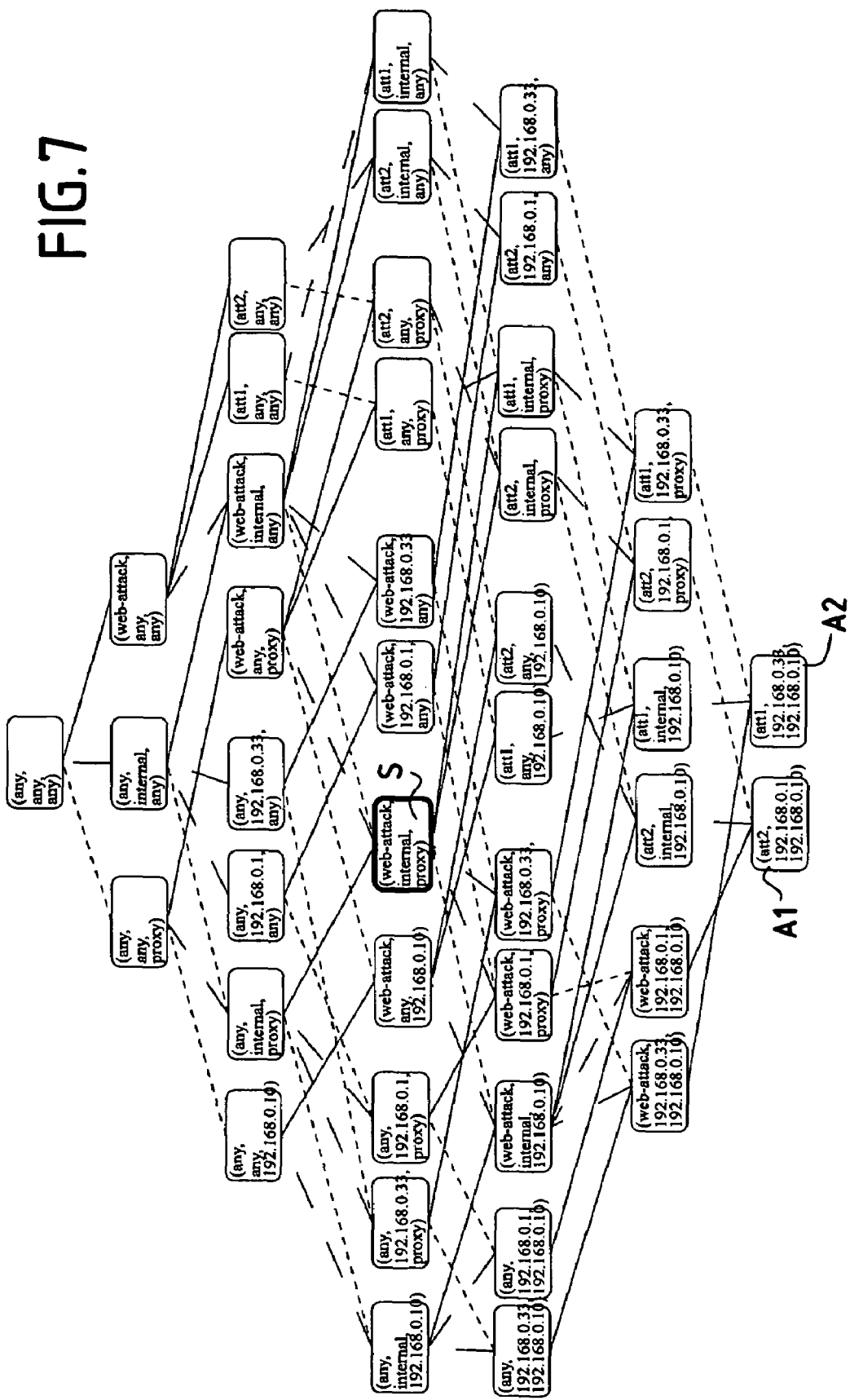
FIG. 7 shows a general trellis associated with two generalized alerts in the hierarchies of FIGS. 6A to 6C.

FIGS. 6A to 7 show a simplified example of classifying a set of alerts issued by intrusion detection sensors.

In this example, the alerts are triplets (name,src,dst)∈N×S× D, where N represents the set of alert identifiers, S represents the set of attack sources, and D represents the set of attack targets. In other examples, the alerts could consist of other attribute types or the same attribute types with domains defined differently.

At the lowest lower of abstraction, the alert identifiers are the signature identifiers of the Snort™ intrusion detector tool. The higher level of abstraction consists of the attack classes defined by Snort™. The higher level of abstraction consists of a single element "any".

FIG. 6A shows a simplified hierarchy associated with the domain of the set of identifiers. The first level N11 of abstraction or generalization includes the elements "att1" and "att2". The second and third levels of generalization N12, N13 include the elements "web-attack" and "any", respectively.

At the lowest level of abstraction, the attack sources are IPv4 addresses. The higher level of abstraction consists of the network domain names managed by the IANA™ organization and its local branches (RIPE, APNIC, ARIN, etc.). The IP addresses not registered in the IANA™ database or at public addresses internal to the information system under surveillance or the private IP addresses are abstracted in CIDR notation (for example 192.168.0.0/24). The higher level may consist of two elements, labeled "external" and "internal", to designate the exterior and the interior of the information system. The next level of abstraction consists of a single element "any".

The FIG. 6B example shows a simplified hierarchy associated with the domain of the set of attack sources. The first level of abstraction or generalization includes the elements "192.168.01" and "192.168.0.33". The second and third levels of generalization include the elements "internal" and "any", respectively.

At the lowest level of abstraction, the attack targets are the public and private IP addresses of the information system. The next level of abstraction consists of the network addresses in CIDR notation. The next level of abstraction consists of a single element "any".

FIG. 6C shows a simplified hierarchy associated with the domain of the set of attack targets. The first, second and third levels of abstraction or generalization include the elements "192.168.0.10", "proxy" and "any", respectively.

FIG. 7 shows a general trellis associated with two alerts A1 and A2 defined by A1(att2, 192.168.0.1, 192.168.0.10) and A2(att1, 192.168.0.33, 192.168.0.10).

In this example, and in accordance with the hierarchies of attributes of FIGS. 6A to 6C, the attack identifiers are generalized into the attack class "web-attack" and then into "any".

The IP addresses of the attackers are generalized into "internal" and then into "any".

The IP addresses of the victims are generalized as a function of the "proxy" host and then "any".

In this example, there are two separate attackers 192.168.0.1 (alert A1) and 192.168.0.33 (alert A2) (these are internal IP addresses). There is only one victim 192.168.0.10, which a web proxy.

The most abstract alert inferred by the system is (any, any, any). The solid arrows denote a generalization in accordance with the attribute that corresponds to the attack, the dashed arrows denote a generalization in accordance with the attribute that corresponds to the attacker, and the dotted arrows denote a generalization in accordance with the attribute that corresponds to the victim.

On completion of the process of selecting pertinent alerts, the system proposes the collated alert (web-attack, internal, proxy). The other alerts are either too general or too specific.

The invention claimed is:

1. A method of automatically classifying alerts issued by intrusion detection sensors of an information security system for producing collated alerts, each alert being defined by a plurality of qualitative attributes $(a_1, \ldots, a_n)$ belonging to a plurality of attribute domains $(A_1, \ldots, A_n)$ each of which has a partial order relationship, which method comprises the following steps:

organizing the attributes belonging to each attribute domain into a hierarchical structure including levels defined in accordance with the partial order relationship of the attribute domain, the attribute domains thus forming hierarchical structures;

constructing for each alert issued by the intrusion detection sensors a trellis specific to that alert by generalizing each alert in accordance with each of its attributes and at all the levels of the hierarchical structure, the specific trellis including nodes corresponding to alerts linked to each other by arcs so that each node is linked to one or more parent nodes and/or to one or more child or descendant nodes;

iteratively merging each specific trellis into a general trellis;

identifying collated alerts in the general trellis by selecting the alerts that are simultaneously the most pertinent and the most general in accordance with statistical criteria and according to their attributes belonging to lower levels of the hierarchical structures; and supplying the collated alerts to an output unit of an alert management system in order to provide an overview of all the alerts issued by the intrusion detection sensors.

2. The method according to claim 1, wherein the construction of a specific trellis includes the following steps:

for any generalizable attribute of a given alert, recovering the generalized value of that attribute from its hierarchical structure to form a new alert more general than said given alert;

adding a new node to the specific trellis corresponding to the new alert and adding an arc going from the new node of the new alert to the node of the given alert; and adding missing arcs going from the parent nodes of the given alert resulting from the generalization of the given alert in accordance with its other attributes to the node of the new alert.

3. The method according to claim 1, wherein merging a given specific trellis into the general trellis includes the following steps:

selecting a first node corresponding to a first alert belonging to the given specific trellis and a second node corresponding to a second alert belonging to the general trellis;

eliminating all the arcs coming from the parent nodes of an offspring node of the first node if said offspring node belongs to said general trellis; and adding said offspring node and all its descendants to the general trellis if said offspring node does not belong to the general trellis.

4. The method according to claim 1, a pertinent alert is identified when each of the sets of offspring nodes of the pertinent alert resulting from specialization of that alert in accordance with each of its attribute domains is homogeneous and when the number of elements constituting each of said sets of offspring nodes of the pertinent alert is greater than a threshold value.

5. The method according to claim 1, wherein the collated alerts are associated with different groups of alerts issued by the sensors so that the groups are not mutually exclusive.

6. The method according to claim 1, wherein the attribute domains include domains from the following sets: alert identifiers, attack sources, attack targets, and attack dates.

7. A computer readable storage medium encoded with a computer program designed to execute the method according to claim 1 when it is executed by the alert management system.

8. An alert management system for automatically classifying alerts issued by intrusion detection sensors for producing collated alerts, each alert being defined by a plurality of qualitative attributes $(a_1, \ldots, a_n)$ belonging to a plurality of attribute domains $(A_1, \ldots, A_n)$ each of which has a partial order relationship, which system comprises:

processor means for organizing the attributes belonging to each attribute domain into a hierarchical structure including levels defined in accordance with the partial order relationship of the attribute domain, the attribute domains thus forming hierarchical structures;

processor means for constructing for each alert issued by the intrusion detection sensors a trellis specific to that alert by generalizing each alert in accordance with each of its attributes and at all the levels of the hierarchical structure, the specific trellis including nodes corresponding to alerts linked to each other by arcs so that each node is linked to one or more parent nodes and/or to one or more child or descendant nodes;

processor means for iteratively merging each specific trellis into a general trellis;

processor means for identifying collated alerts in the general trellis by selecting the alerts that are simultaneously the most pertinent and the most general in accordance with statistical criteria and according to their attributes belonging to lower levels of the hierarchical structures; and processor means for supplying the collated alerts to an output unit in order to provide an overview of all alerts issued by the intrusion detection sensors.

9. An information security system comprising intrusion detection sensors and an alert management system according to claim 8.

* * * * *